Oct. 30, 1956   C. O. CHRISTENSEN   2,768,862
WHEEL CONSTRUCTION
Filed July 23, 1954
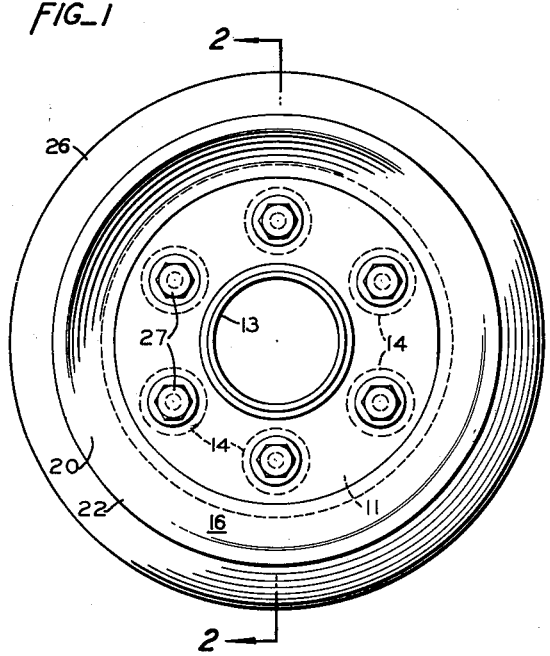
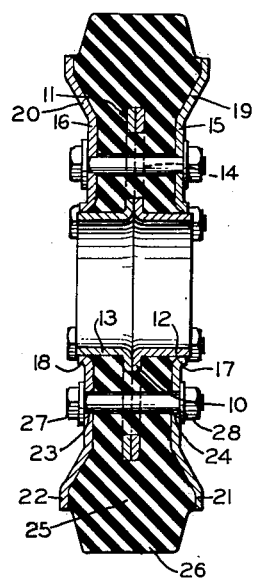
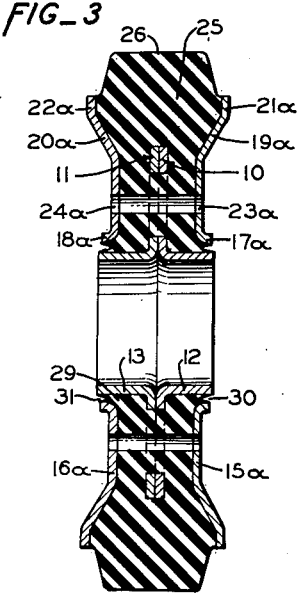
INVENTOR.
CARL O. CHRISTENSEN
BY
Mellin and Hanscom
ATTORNEYS

United States Patent Office 2,768,862
Patented Oct. 30, 1956

2,768,862

WHEEL CONSTRUCTION

Carl O. Christensen, Walnut Creek, Calif., assignor to Roll-Rite Corporation, Oakland, Calif., a corporation of California Application July 23, 1954, Serial No. 445,325

19 Claims. (Cl. 301—63)

The present invention relates to wheels, and more particularly to wheels used on industrial trucks and similar load carrying vehicles.

Rubber tires and similar wheels have been used on industrial trucks operating in and around industrial plants and warehouses for the purposes, among others, of absorbing shock and diminishing noise. In prior rubber-tired wheels it was customary to make a metal wheel having a groove in its periphery and then bond or otherwise fix an annular ring of rubber or other elastomer material in the annular groove. Such wheels, however, tend to flatten against the floor, thereby requiring greater effort on the part of a person or persons, or by motorized equipment in effecting their rolling and movement of the vehicle. The flattening of the wheel also presents a greater frictional resistance to its turning about a vertical axis during steering of the vehicle. A further disadvantage of such wheels is that under heavy loads the tire tends to creep and shear the relatively limited bond between tire and wheel.

It is the principal object of this invention to provide a novel form of rubber-tired wheel, wherein the degree of flattening under heavy loads is greatly reduced to facilitate the rolling of the wheel and to reduce the frictional resistance to turning thereof about a vertical axis.

A further object of this invention is to provide a novel form of rubber-tired wheel construction wherein there is a greater area of bonding surface between the wheel and the tire.

Another object of this invention is to provide a rubber-tired wheel structure wherein the amount of resilience of the tire may be changed in accordance with the type of load that the wheel is to support.

A preferred embodiment of the invention is described in the following detailed specification and illustrated by way of example in the accompanying drawings, wherein:

Fig. 1 is a side elevation of a wheel embodying the principles of the invention.

Fig. 2 is a sectional view taken on line 2—2 of Fig. 1.

Fig. 3 is a similar view to that shown in Fig. 2 and illustrates a modification of the invention.

Referring now to the drawings, wherein the same reference numerals are used to denote the same elements throughout the various views shown, 10 and 11 generally indicate two identical flat circular members each having a circular outwardly extending flange 12 and 13, respectively, defining a central opening therethrough. The two members 10 and 11 are arranged in back-to-back relation with the flanges 12 and 13 extending outwardly therefrom in opposite directions and define a central aperture through the assembly. Each of the members 10 and 11 has a plurality of relatively large diameter holes 14 formed therein, said holes being equally spaced around said central aperture.

A second pair of flat circular members or discs 15 and 16, each having a small outwardly bent flange 17 and 18, respectively, defining a central aperture, is arranged parallel to but spaced from the first pair of flat members 10 and 11, with the inner surfaces of the flanges 17 and 18 forming a running slip fit with the exterior of flanges 12 and 13. Each of the discs 15 and 16 is bent outwardly away from each other adjacent its outer rim as indicated at 19 and 20, respectively. The outer rim of each disc is bent back parallel to the plane of the central portion of the disc, as indicated at 21 and 22, respectively. Each of the discs 15 and 16 is provided with a plurality of relatively small holes 23 and 24, respectively. The holes 23 or 24 in each of the discs 15 and 16 are the same in number, and are arranged coaxially with the larger diameter holes 14 formed in the circular members 10 and 11.

The space between the discs 15 and 16 and the circular members 10 and 11 is filled with elastomer material 25 which is bonded to the adjacent faces of the discs 15 and 16 and the circular members 10 and 11. The elastomer material is molded into a floor engaging tread extending radially outwardly beyond the rim of the discs 15 and 16 in the manner indicated at 26.

A plurality of bolts 27 extends through the holes 23 and 24 in the discs 15 and 16, and through the holes 14 in the circular members 10 and 11. Each of the bolts 27 has a nut 28 threaded thereon. It is obvious that the greater the tension applied to the bolts 27 by tightening the nuts 28, the greater will be the compression prestressed in the elastomer material confined between the discs 15 and 16, and the more elastomer material 25 will be forced outwardly into the tread portion 26 thereof.

There is a direct relationship between the amount of internal stress in the elastomer material and the ability of the wheel to carry a load without flattening. Thus, if the tension on the bolts 27 is increased, the wheel will be capable of carrying a greater load with the same degree of flattening under load than could be carried with a lesser tension on the bolts 27. The resilience of the wheel varies inversely with the load carrying ability. Thus, for use with light loads that might require a greater degree of resilience or cushioning, the tension on the bolts 27 is reduced or the bolts may be entirely omitted.

In the modification shown in Fig. 3, the wheel structure has been modified to provide even a greater resilience than is possible with the structure shown in Figs. 1 and 2. In this modification, the circular members 10 and 11 are identical with those shown in Figs. 1 and 2. The discs 15a and 16a have been modified to provide a larger central aperture so that the flanges 17a and 18a thereof are concentric with but spaced from the flanges 12 and 13 of the circular members 10 and 11, in the manner indicated at 29. The elastomer material 25 which is located between the flanges 17a and 12 and that located between flanges 18a and 13 is notched inwardly from the side, in the manner shown at 30 and 31, respectively, to prevent direct compression and rim cutting thereof when the discs 15a and 16a move relative to the flat circular members 10 and 11.

From the foregoing description, it is evident that I have provided a wheel which is capable of adjustment as to its resiliency or load carrying capacity over a wide range of loading characteristics. It is also evident that, due to the prestressed condition of the rubber, the wheel will flatten less under a given load than other types of rubber-tired wheels, hence the rolling resistance and also the frictional resistance to turning about a vertical axis are both reduced.

While I have shown and described the preferred forms of my invention, it is obvious that various changes may be made therein by those skilled in the art, without de-

Having thus described my invention, what I claim and desire to secure by Letters Patent is:

1. In a wheel construction, a central hub, a flange extending radially outward from the center of said hub, a pair of discs one on either side of said flange, said discs being substantially parallel to but spaced laterally from said flange, elastomer material filling the space between said flange and said discs and extending outwardly beyond said outer edges of said flange and discs, said elastomer material being bonded to said flange and said discs.

2. In a wheel construction, a central hub, a flange extending radially outward from the center of said hub, a pair of discs one on either side of said flange, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs.

3. In a wheel construction, a central hub, a flange extending radially outward from the center of said hub, a pair of discs one on either side of said flange, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs, means under tension connecting said discs whereby the elastomer material between said discs is compressed and a portion thereof is forced radially outward.

4. In a wheel construction, a central hub, a flange extending radially outward from the center of said hub, a pair of discs one on either side of said flange, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs, a plurality of holes in each of said discs, said holes being spaced equally circumferentially from each other around said discs, a plurality of holes spaced circumferentially around said flange, the holes in said discs and said flange being in axial alignment, means extending through said holes connecting said discs, means for tensioning said means connecting said discs whereby the elastomer material between said discs is compressed and a portion thereof is forced radially outward.

5. A wheel construction as set forth in claim 4 wherein the holes in said flange are materially larger than the holes in said discs.

6. In a wheel construction, a central hub, a flange extending radially outward from the center of said hub, a pair of discs one on either side of said flange, a central aperture in each of said discs of a diameter substantially the same as the exterior diameter of said hub, said discs being substantially parallel to but spaced laterally from said flange, elastomer material filling the space between said flange and said discs and extending outwardly beyond said outer edges of said flange and discs, said elastomer material being bonded to said flange and said discs.

7. In a wheel construction, a central hub, a flange extending radially outward from the center of said hub, a pair of discs one on either side of said flange, a central aperture in each of said discs of a diameter substantially the same as the exterior diameter of said hub, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs.

8. In a wheel construction, a central hub, a flange extending radially outward from the center of said hub, a pair of discs one on either side of said flange, a central aperture in each of said discs of a diameter substantially the same as the exterior diameter of said hub, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs, means under tension connecting said discs whereby the elastomer material between said discs is compressed and a portion thereof is forced radially outward.

9. In a wheel construction, a central hub, a flange extending radially outward from the center of said hub, a pair of discs one on either side of said flange, a central aperture in each of said discs of a diameter substantially the same as the exterior diameter of said hub, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs, a plurality of holes in each of said discs, said holes being spaced equally circumferentially from each other around said discs, a plurality of holes spaced circumferentially around said flange, the holes in said discs and said flange being in axial alignment, means extending through said holes connecting said discs, means for tensioning said means connecting said discs whereby the elastomer material between said discs is compressed and a portion thereof is forced radially outward.

10. A wheel construction as set forth in claim 9 wherein the holes in said flange are materially larger than the holes in said discs.

11. In a wheel construction, a central hub, a flange extending radially outward from the center of said hub, a pair of discs one on either side of said flange, a central aperture in each of said discs of a diameter slightly larger than the exterior diameter of said hub, said discs being substantially parallel to but spaced laterally from said flange, elastomer material filling the space between said flange and said discs and extending outwardly beyond said outer edges of said flange and discs, said elastomer material being bonded to said flange and said discs.

12. In a wheel construction, a central hub, a flange extending radially outward from the center of said hub, a pair of discs one on either side of said flange, a central aperture in each of said discs of a diameter slightly larger than the exterior diameter of said hub, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs.

13. In a wheel construction, a central hub, a flange extending radially outward from the center of said hub, a pair of discs one on either side of said flange, a central aperature in each of said discs of a diameter slightly larger than the exterior diameter of said hub, said discs being substantially parallel to but spaced laterally from said flange, the outer portions of said discs being bent outwardly away from each other, elastomer material filling the space between said flange and said discs and extending outwardly beyond said outer edges of said flange and discs, said elastomer material being bonded to said flange and said discs, means under tension connecting said discs whereby the elastomer material between said discs is compressed and a portion thereof is forced radially outward.

14. In a wheel construction, a central hub, a flange extending radially outward from the center of said hub, a pair of discs one on either side of said flange, said discs being substantially parallel to but spaced laterally from said flange, a central aperture in each of said discs of a diameter slightly larger than the exterior diameter of said hub, the outer portions of said discs being bent outwardly away from each other, elastomer material filling the space between said flange and said discs and extending outwardly beyond said outer edges of said flange and discs, said elastomer material being bonded to said flange and said discs, a plurality of holes in each of said discs, said holes being spaced equally circumferentially from each other around said discs, a plurality of holes spaced circumferentially around said flange, the holes in said discs and said flange being in axial alignment, means extending through said holes connecting said discs, means for tensioning said means connecting said discs whereby the elastomer material between said discs is compressed and a portion thereof is forced radially outward.

15. A wheel construction as set forth in claim 14 wherein the holes in said flange are materially larger than the holes in said discs.

16. In a wheel construction, a central hub, a pair of rigid discs, said discs being spaced laterally from each other and extending substantially radially outward from said hub, elastomer material filling the space between said discs and extending outwardly beyond the outer edges of said discs, said elastomer material being bonded to said discs.

17. A wheel construction as described in claim 16 wherein each of said rigid discs has a central aperture substantially larger in diameter than the external diameter of said hub.

18. A wheel construction as set forth in claim 17 having tension means connecting the rigid discs, and means for varying the tension on said tension means.

19. A wheel construction as described in claim 16 having tension means connecting the rigid discs, and means for varying the tension on said tension means.

References Cited in the file of this patent

UNITED STATES PATENTS

| | | |
|---|---|---|
| 774,927 | Zamboni | Nov. 15, 1904 |
| 1,459,430 | Aitkens | June 19, 1923 |
| 2,245,444 | Ross | June 10, 1941 |
| 2,271,166 | Weiss | Jan. 27, 1942 |